Feb. 17, 1925. 1,526,479
A. S. KARPER
SAFETY BUMPER GUARD FOR AUTOMOBILES AND LIKE VEHICLES
Filed Dec. 16, 1922 2 Sheets-Sheet 1

Inventor
Abraham Singer Karper witness
Abraham Karper

Feb. 17, 1925.

A. S. KARPER 1,526,479

SAFETY BUMPER GUARD FOR AUTOMOBILES AND LIKE VEHICLES

Filed Dec. 16, 1922    2 Sheets-Sheet 2

Inventor:
Abraham Singer Karper

Witness:
Abraham Karper

Patented Feb. 17, 1925.

1,526,479

UNITED STATES PATENT OFFICE.

ABRAHAM SINGER KARPER, OF BROOKLYN, NEW YORK.

SAFETY BUMPER GUARD FOR AUTOMOBILES AND LIKE VEHICLES.

Application filed December 16, 1922. Serial No. 607,447.

*To all whom it may concern:*

Be it known that I, ABRAHAM SINGER KARPER, a citizen of the United States, residing at 1402 Ditmas Avenue, Brooklyn, New York, have invented certain new and useful Improvements in Safety Bumper Guards for Automobiles and like Vehicles, of which the following is a specification, the accompanying drawings aiding in the explanation thereof.

The same numbers on all drawings refer to the corresponding parts.

This invention is for the purpose of absorbing the shocks in head-on collisions, lessening the danger to the occupants of the car, the chief features being to prevent injury to pedestrians, by so constructing my safety-guard so as to operate automatically and instantaneously, without necessitating any control by the driver (when said device comes in contact with a pedestrian) also automatically moving back into its position at rest when the pressure caused by the weight of the pedestrian against the safety-guard is removed.

Further, my invention is also so constructed as to provide for a catcher attachment, specially constructed for this purpose. This catcher 6, 7, in Figs. 1 and 2 at rest, is forced to open jaw-like, side view Fig. 4, preventing a person from falling beneath the wheels of an automobile.

My invention differs from others, also, in that it has an upper rear-guard 4, and a lower foreguard 5, Figs. 1 and 2. The lower foreguard 5, extends beyond the upper 4, is the first to receive the shock when in contact with a foreign body, the lower 5, being so balanced as to offer very little resistance, so that it moves downward and backward due to its special construction and attachment, bringing the other mechanism of my safety guard into play.

This invention of mine is of simple construction, of but few parts made entirely of metal, is useful as a safety device to prevent injury to pedestrians. When in head on contact all the working parts are automatically brought into play, and on removal, of the obstruction the entire safety-bumper-guard again assumes its original position at rest due to its special construction so to do.

Ordinarily when a pedestrian is struck by an oncoming automobile or like vehicle he is thrown forward, the distance varying with the speed of the automobile or like vehicle. In my safety-bumper-guard, the action is as follows, regardless of the speed of the oncoming automobile. The pedestrian as soon as he strikes the lower foreguard 5 by his pressure and weight causes said foreguard 5 to move downward and backward. The downward and backward movement of foreguard 5, causes the upper rearguard 4, to move upward and backward and between the two guards 4 and 5, is suspended catcher 6, 7, which acts as a receiver for the pedestrian struck, preventing him from being injured.

Figure 1:
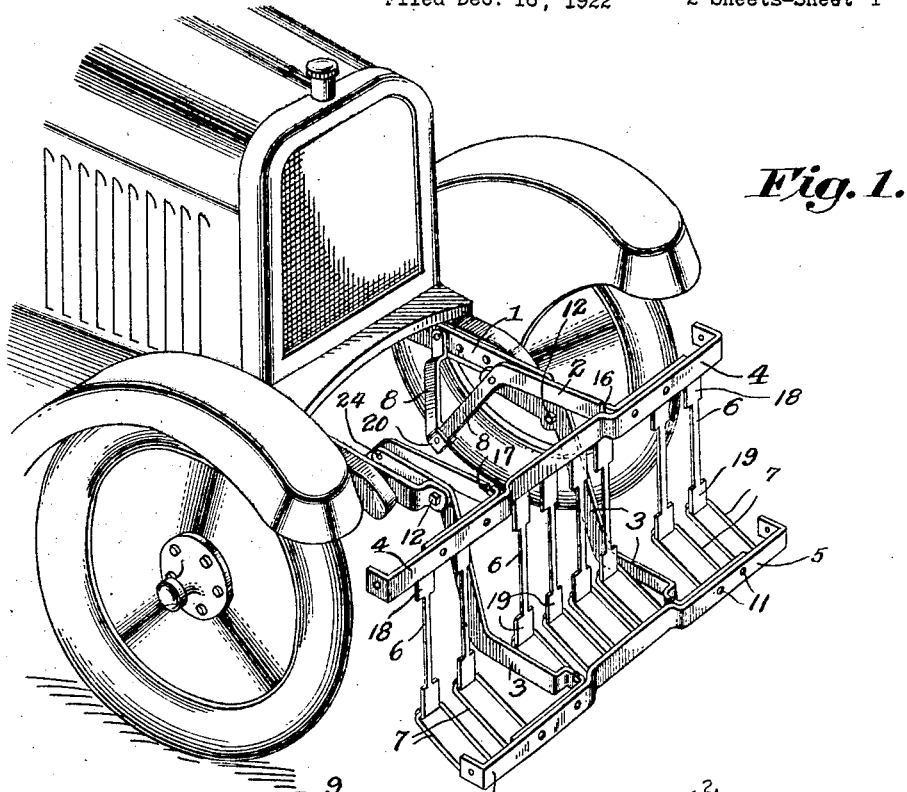
Figure 1 is a perspective view of my invention attached to an automobile.
Figure 2:
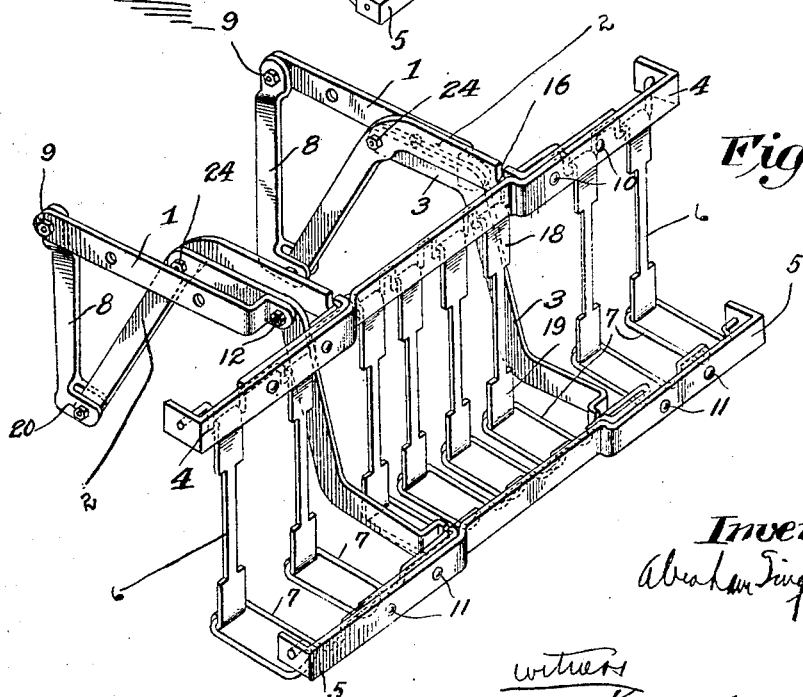
Figure 2 is a perspective view of the invention showing more details.

The lower extending arms 3, in Figs. 1, and 2, extend a certain distance in front of the upper extending arms 2, said extending arms 3, having attached foreguard 5, at point 11, said foreguard 5, extending horizontally across, connecting the extending arms to form the upper main frame 3, said foreguard 5 is bent specially to a certain form as shown.

Figure 4:
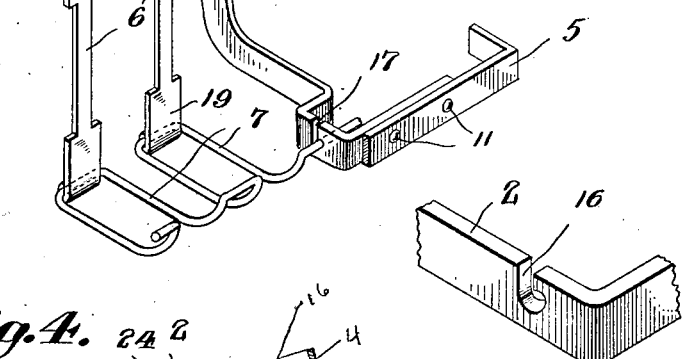
Figure 4 is a fragmentary section showing the pivoted arm.

The extending arms 3, are pivoted and perforated at points 12, Figs. 1, 2, 4, to main bar 1, same Figs. 1, 2, 4, at points 12, said bar 1, being means of attachment to the automobile.

The lower extending arms 3, are connected at their ends 24 to upper extension arms 2, by bolts passing thru at points 24. The lower ends 20, of upper extension arms 2, are in turn connected to connecting rods 8, said connecting rods 8, being in turn connected at 9, to main bar 1.

At all these points of connection, 9, 20, 24, 12, the parts are held together by bolts and washers so as to make the separate parts hold together at these points easily movable forward and backward, (the special connecting points being so constructed as to prevent movement from side to side), at the same time holding extension arms 2 and 3, and connecting rods 8, in their respective positions. The upper extension arms 2 are held together by a bar 4 at points 10. This bar is placed horizontally across to connect the extension arms at points 10. This bar 4 is specially shaped for this purpose as shown.

Figure 3:
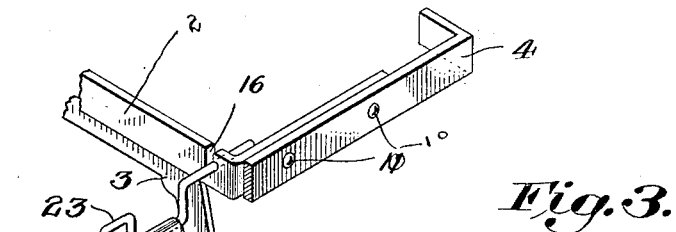
Figure 3 is a fragmentary perspective showing the connecting means.

The catcher 6, 7, consists of a series of vertically designed metallic strips 6, bent at upper ends 18, to fit in their respective positions at 22, on bent rod 23, Fig. 3, and at lower ends 19, to fit into positions and support lower part of catcher 7, Figs. 3, and 4. The entire catcher 6, 7, is then suspended at points 16, of upper extension arms 2, Fig. 3, and is supported at its lower ends on lower extension arms 3, at points 17, Fig. 3.

A person struck by an automobile having attached my safety-bumper-guard, comes in contact with the lower protruding foreguard 5. Said foreguard 5, is attached to extending arms 3, pivoting at points 12, said foreguard 5, being balanced at points 24, by upper extending arms 2, and their attachments consisting of rearguard 4, and catcher 6, 7, said catcher 6, 7, being suspended from its positions on extension arms 2, just in back of rearguard 4, so that said foreguard 5, moves easily backward and downward. In so doing foreguard 5, causes its extension arms connected at 24, to move upwards causing the upper extension arms 2, connected at 24, to move upwards and backwards, the rod 8, being connected at points 20, of upper extension arms 2 to prevent lower part of upper extension arms 2, from moving forward and assist in balancing the upward movements of same extension arms 2, to work in harmony with the downward and backward movements of the lower extension arms 3 Figs. 4, 2, 1, creating a jaw-like movement Fig. 4. The catcher 6, 7, opening up as it were to prevent the said person from passing underneath the automobile. The safety guard is so balanced as to assume its normal position at rest as in Figs. 1 and 2, after the obstruction is removed.

This safety-bumper-guard is ideal in that it is self-balancing and requires no springs. It can be used without the catcher to equal advantage due to its self-balancing characteristics. Because of its simple construction it moves easily on contact with a foreign object, the lower foreguard 5, moving downward and backward in this way breaking the contact shock, and the upper guard 4, moving upward and in this way raising the catcher 6, 7, with it, the two guards 4, and 5; again assuming their position at-rest when the obstruction is removed. The downward and backward moving foreguard will slightly break the shock on contact. With the downward and backward movement of the lower foreguard 5, the other mechanism is brought into play making this a real safety-bumper-guard.

Figure 6:
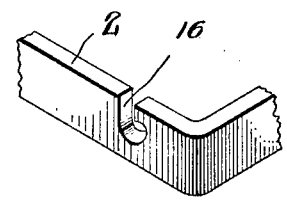
Figure 6 is a fragmentary perspective showing suspending notch for the fender elements.
Figure 7:
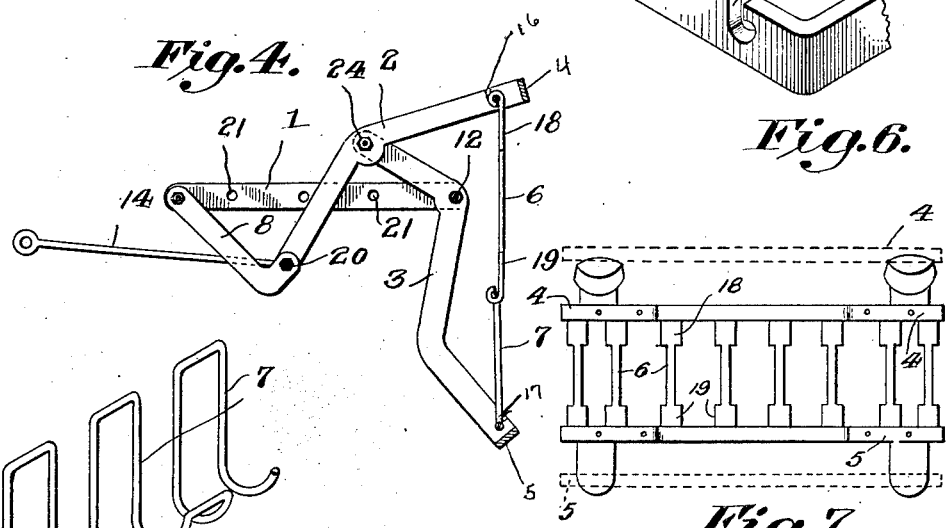
Figure 7 is a front elevation of the element 6.
Figure 5:
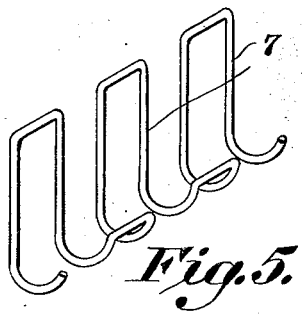
Figure 5 is a perspective showing the form of the catcher element 7.

In a headon or front view, this safety-bumper-guard presents an appearance similar to drawing in Fig. 6, in its attachment to an automobile, showing upper 4, and lower foreguard 5, and upper part of catcher 7. The lower part of catcher 7, is not visible on front view due to its folded position at rest, and due to its shape Fig. 5. It is only seen in head-on view when pressure is applied to foreguard 5, causing the upper extension arms to move upward thus raising the catcher 6, 7, from its position at rest as in Figs. 1, 2, 4, 6. The main bars 1, and extension arms 2 and 3, and rod 8, are constructed in pairs one right and one left sided to permit attachment to one another and to be freely movable.

Pressure applied to upper horizontal bar 4, will force extending arms 2, and its attachments upwards and backward thus bringing about a downward and backward movement of the lower horizontal bar 5, and its attachments, due to the easily balancing properties of the entire safety-bumper-guard, inverting the same process as explained before, describing the movements when pressure is applied to the lower horizontal bar 5.

The above being as nearly as possible a concise description of the above drawings, what I claim as new and desire to secure by Letters Patent is:

1. A safety-bumper-guard having an upper and lower main frame formed by upper and lower extending arms connected by formed horizontal bars, having suspended from the upper extending arms near their junction with the horizontal bars, from a specially formed bent rod, a series of vertically arranged metallic strips specially shaped and so provided for attachment as to be easily movable forward and backward, these strips being connected at their upper ends to the specially bent rod and at their lower ends attached to another specially bent rod which in turn rests on the lower extending arms.

2. A safety-bumper-guard having two lower extension arms held together by a horizontal bar and supporting at their upper ends two other extension arms also held together by a horizontal bar; said upper extension arms in turn being connected at their rear ends to two rods which are in turn connected to a main bar connected to the frame of the automobile, said upper extension arms also supporting at their forward ends near their junction with the upper horizontal bar, a catcher formed by a series of vertically arranged metallic strips suspended from a bent rod resting on said upper extension arms, the lower extension arms pivoting and balancing the upper extension arms at a point below the upper end of said lower extension arms and at which point said lower extension arms are connected to the main bar, said lower extension arms also supporting at back of its junction with its horizontal bar the lower part of the catcher which in turn is connected to the upper part of the catcher.

In testimony that I claim the foregoing I have hereunto set my hand this 6th day of December, 1924.

ABRAHAM SINGER KARPER.